(12) United States Patent
Yang (10) Patent No.: US 12,309,718 B2
(45) Date of Patent: May 20, 2025

(54) METHODS AND APPARATUSES FOR PROCESSING TRANSMISSION POWER LEVEL INFORMATION, AND COMPUTER STORAGE MEDIA

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd.

( * ) Notice: Subject to any disclaimer, the term of this patent is extended or adjusted under 35 U.S.C. 154(b) by 769 days.

(21) Appl. No.: 17/629,298

(22) PCT Filed: Jul. 24, 2019

(86) PCT No.: PCT/CN2019/097576
§ 371 (c)(1),
(2) Date: Jan. 21, 2022

(87) PCT Pub. No.: WO2021/012232
PCT Pub. Date: Jan. 28, 2021

(65) Prior Publication Data
US 2022/0248346 A1    Aug. 4, 2022

(51) Int. Cl.
*H04W 4/00* (2018.01)
*H04W 52/14* (2009.01)
(Continued)

(52) U.S. Cl.
CPC ......... *H04W 52/367* (2013.01); *H04W 52/14* (2013.01); *H04W 52/241* (2013.01);
(Continued)

(58) Field of Classification Search
CPC . H04W 52/367; H04W 52/14; H04W 52/241; H04W 52/242
See application file for complete search history.

(56) References Cited

U.S. PATENT DOCUMENTS 9,942,857 B2    4/2018   Lim et al.
2012/0106477 A1*  5/2012  Kwon ............... H04W 52/365
                                                         370/328
(Continued)

FOREIGN PATENT DOCUMENTS

CN         105745976 A    7/2016
CN         109257810 A    1/2019
(Continued)

OTHER PUBLICATIONS

ISA State Intellectual Property Office of the People's Republic of China, International Search Report Issued in Application No. PCT/CN2019/097576, Apr. 10, 2020, WIPO, 4 pages.
(Continued)

*Primary Examiner* — Omoniyi Obayanju
(74) *Attorney, Agent, or Firm* — Volpe Koenig (57) ABSTRACT

Embodiments of the present disclosure disclose a method and an apparatus for processing transmission power level information, and a computer readable storage medium. The method of processing transmission power level information includes: determining transmission power level information based on a correspondence between transmission power levels and transmission power regions; and sending the transmission power level information to a second user equipment.

20 Claims, 5 Drawing Sheets

(51) Int. Cl.
*H04W 52/24* (2009.01)
*H04W 52/36* (2009.01)
*H04W 56/00* (2009.01)
*H04W 92/18* (2009.01)

(52) U.S. Cl.
CPC ....... *H04W 52/242* (2013.01); *H04W 56/001* (2013.01); *H04W 92/18* (2013.01)

(56) References Cited

U.S. PATENT DOCUMENTS

| | | |
|---|---|---|
| 2016/0286499 A1 | 9/2016 | Lim et al. |
| 2019/0208476 A1 | 7/2019 | Wu et al. |
| 2020/0022089 A1* | 1/2020 | Guo .................... H04W 52/242 |
| 2020/0154373 A1 | 5/2020 | Lu et al. |

FOREIGN PATENT DOCUMENTS

| | | |
|---|---|---|
| CN | 109392069 A | 2/2019 |
| WO | 2018053808 A1 | 3/2018 |
| WO | 2018/222123 A1 | 12/2018 |

OTHER PUBLICATIONS

Chinese Office Action and Search Report issued on Feb. 18, 2022 for Chinese Application No. 201980001535.1, 13 pages.
Written Opinion of the International Searching Authority issued on Apr. 10, 2020 for Application No. PCT/CN2019/097576, 7 pages.

* cited by examiner

METHODS AND APPARATUSES FOR PROCESSING TRANSMISSION POWER LEVEL INFORMATION, AND COMPUTER STORAGE MEDIA

CROSS-REFERENCE TO RELATED APPLICATION

This application is the U.S. national phase application of International Application No. PCT/CN2019/097576, filed on Jul. 24, 2019, the disclosure of which is incorporated herein by reference in its entirety for all purposes.

TECHNICAL FIELD

The present disclosure relates to communication technologies, and in particular, relates to a method of processing transmission power level information, an apparatus for processing transmission power level information, and a computer storage medium.

BACKGROUND

A sidelink, which is sometimes also called a vice link or a direct-connected link, is introduced as a communication way for supporting a direct communication between a user equipment (UE) and another UE.

However, there exists a problem of high power consumption for the UE that communicates via the sidelink.

SUMMARY

The present disclosure provides a method of processing transmission power level information, an apparatus for processing transmission power level information, and a computer storage medium.

According to a first aspect of embodiments of the present disclosure, there is provided a method of processing transmission power level information, which is applicable to a first user equipment (UE), and includes: determining transmission power level information based on a correspondence between transmission power levels and transmission power regions; and sending the transmission power level information to a second UE.

In the above solution, said sending the transmission power level information to the second UE includes: sending, to the second UE, sidelink control information (SCI) carrying the transmission power level information.

In the above solutions, the method further includes: receiving the correspondence sent by a base station; or, obtaining the correspondence that is pre-configured or pre-determined.

In the above solutions, said determining the transmission power level information based on the correspondence between transmission power levels and transmission power regions includes: obtaining the transmission power level information by inquiring about the correspondence, e.g., by querying a database storing the correspondence, based on a transmission power at which the first UE transmits sidelink data.

In the above solutions, said determining the transmission power level information based on the correspondence between transmission power levels and transmission power regions includes: in response to determining that the first UE and the second UE are synchronized through a base station, determining the transmission power level information based on the correspondence sent by the base station.

In the above solutions, said determining the transmission power level information based on the correspondence between transmission power levels and transmission power regions includes: in response to determining that the first UE and the second UE are synchronized through an object other than a base station, determining the transmission power level information based on the correspondence that is pre-configured or predetermined.

According to a second aspect of embodiments of the present disclosure, there is provided a method of processing transmission power level information, which is applicable to a second user equipment (UE), and includes: receiving transmission power level information sent by a first UE; and determining, based on the transmission power level information, a transmission power of sidelink data transmitted from the first UE.

In the above solution, said receiving the transmission power level information sent by the first UE includes receiving sidelink control information (SCI) sent by the first UE, wherein the transmission power level information is carried in SCI.

In the above solutions, the method further includes: after receiving the transmission power level information, measuring a sidelink channel to obtain a reference signal receiving power (RSRP) of the sidelink channel; and determining a path loss of the sidelink channel based on the RSRP and the transmission power of the sidelink data transmitted from the first UE.

In the above solutions, the method further includes: controlling, based on the path loss, a transmission power at which sidelink data is transmitted to the first UE.

In the above solutions, the method further includes: receiving a correspondence between transmission power levels and transmission power regions which is sent by a base station; or, obtaining a correspondence between transmission power levels and transmission power regions which is pre-configured.

In the above solutions, said determining based on the transmission power level information, the transmission power of the sidelink data transmitted from the first UE includes: determining a transmission power region corresponding to the transmission power level information based on the correspondence between transmission power levels and transmission power regions; and determining from the transmission power region, the transmission power of the sidelink data transmitted from the first UE.

In the above solutions, said determining the transmission power region corresponding to the transmission power level information based on the correspondence between transmission power levels and transmission power regions includes: in response to determining that the first UE and the second UE are synchronized through the base station, determining the transmission power region corresponding to the transmission power level information based on the correspondence sent by the base station.

In the above solutions, said determining the transmission power region corresponding to the transmission power level information based on the correspondence between transmission power levels and transmission power regions includes: in response to determining that the first UE and the second UE are synchronized through an object other than the base station, determining the transmission power region corresponding to the transmission power level information based on the correspondence that is pre-configured.

According to a third aspect of embodiments of the present disclosure, there is provided an apparatus for processing transmission power level information, which is applicable to a first user equipment (UE), and includes:
- a determining unit, configured to determine transmission power level information based on a correspondence between transmission power levels and transmission power regions; and
- a sending unit, configured to send the transmission power level information to a second UE.

In the above solution, the sending unit is further configured to send, to the second UE, SCI carrying the transmission power level information.

In the above solutions the apparatus further includes a first obtaining unit, configured to receive the correspondence sent by a base station; or, to obtain the correspondence that is pre-configured.

In the above solutions, the determining unit is further configured to obtain the transmission power level information by inquiring about the correspondence, e.g., by sending a request for the correspondence, or by querying a database storing the correspondence, based on a transmission power at which the first UE transmits sidelink data.

In the above solutions, the determining unit is further configured to, in response to determining that the first UE and the second UE are synchronized through a base station, determine the transmission power level information based on the correspondence sent by the base station.

In the above solutions, the determining unit is further configured to, in response to determining that the first UE and the second UE are synchronized through an object other than a base station, determine the transmission power level information based on the correspondence that is pre-configured.

According to a fourth aspect of embodiments of the present disclosure, there is provided an apparatus for processing transmission power level information, which is applicable to a second user equipment (UE), and includes:
- a receiving unit, configured to receive transmission power level information sent by a first UE; and
- a processing unit, configured to determine, based on the transmission power level information, a transmission power of sidelink data transmitted from the first UE.

In the above solution, the receiving unit is further configured to receive SCI sent by the first UE, where the transmission power level information is carried in the SCI.

In the above solutions, the apparatus further includes a controlling unit, configured to, after receiving the transmission power level information, measure a sidelink channel to obtain an RSRP of the sidelink channel; and determine a path loss of the sidelink channel based on the RSRP and the transmission power of the sidelink data transmitted from the first UE.

In the above solutions, the controlling unit is further configured to control, based on the path loss, a transmission power at which sidelink data is transmitted to the first UE.

In the above solutions, the apparatus further includes a second obtaining unit, configured to receive a correspondence between transmission power levels and transmission power regions which is sent by a base station; or, to obtain a correspondence between transmission power levels and transmission power regions which is pre-configured or pre-stored.

In the above solutions, the processing unit is further configured to determine a transmission power region corresponding to the transmission power level information based on the correspondence between transmission power levels and transmission power regions; and determine, from the transmission power region, the transmission power of the sidelink data transmitted from the first UE.

In the above solutions, the processing unit is further configured to, in response to determining that the first UE and the second UE are synchronized through the base station, determine the transmission power region corresponding to the transmission power level information based on the correspondence sent by the base station.

In the above solutions, the processing unit is further configured to, in response to determining that the first UE and the second UE are synchronized through an object other than the base station, determine the transmission power region corresponding to the transmission power level information based on the correspondence that is pre-configured.

According to a fifth aspect of embodiments of the present disclosure there is provided an apparatus for processing transmission power level information. The apparatus includes one or more processors; and a memory for storing executable instructions for the one or more processors;
- wherein the one or more processors are configured to implement, through executing the executable instructions, the method of processing transmission power level information according to any one of the foregoing technical solutions applicable to a first UE side.

According to a sixth aspect of embodiments of the present disclosure, there is provided an apparatus for processing transmission power level information. The apparatus includes one or more processors; and a memory for storing executable instructions for the one or more processors;
- wherein the one or more processors are configured to implement, through executing the executable instructions, the method of processing transmission power level information according to any one of the foregoing technical solutions applicable to a second UE side.

According to a seventh aspect of embodiments of the present disclosure, there is provided a computer storage medium storing executable instructions therein, where the executable instructions implement, pursuant to being executed by one or more processors, the method of processing transmission power level information according to any one of the foregoing technical solutions applicable to a first UE side.

According to an eighth aspect of embodiments of the present disclosure, there is provided a computer storage medium storing executable instructions therein, where the executable instructions implement, pursuant to being executed by one or more processors, the method of processing transmission power level information according to any one of the foregoing technical solutions applicable to a second UE side.

The technical solutions provided according to the embodiments of the present disclosure may obtain the following beneficial effects.

A first UE determines transmission power level information based on a correspondence between transmission power levels and transmission power regions, and sends the transmission power level information to a second UE. Therefore, it is convenient for the second UE to determine, based on the transmission power level information, a transmission power of sidelink data transmitted from the first UE, without measuring the transmission power of the first UE by the second UE, which can reduce a power consumption of the second UE.

It should be understood that the above general description and the following detailed description are only illustrative and explanatory, and are not intended to limit the scope of the present disclosure.

BRIEF DESCRIPTION OF THE DRAWINGS

The accompanying drawings, which are incorporated in and constitute a part of this specification, illustrate examples consistent with the scope of the present disclosure and, together with the description, serve to explain the principles of the disclosure.

DETAILED DESCRIPTION OF THE EMBODIMENTS

Exemplary embodiments will be described in detail herein with examples thereof illustrated in the accompanying drawings. Where the following descriptions refer to the drawings, like numerals in different drawings refer to like or similar elements unless otherwise indicated. The implementations described in the following examples do not represent all possible implementations within the scope of the present disclosure. Rather, they are merely examples of apparatuses and methods consistent with the scope of the present disclosure as detailed in the appended claims.

The terms used in the present disclosure are for the purpose of describing particular examples only, and are not intended to limit the scope of the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish information of the same category with each other. For example, without departing from the scope of the present disclosure, first information may be referred as second information; and similarly, second information may also be referred as first information. Depending on the context, the word "if" as used herein may be interpreted as "when", "upon", or "in response to determining".

Figure 1:
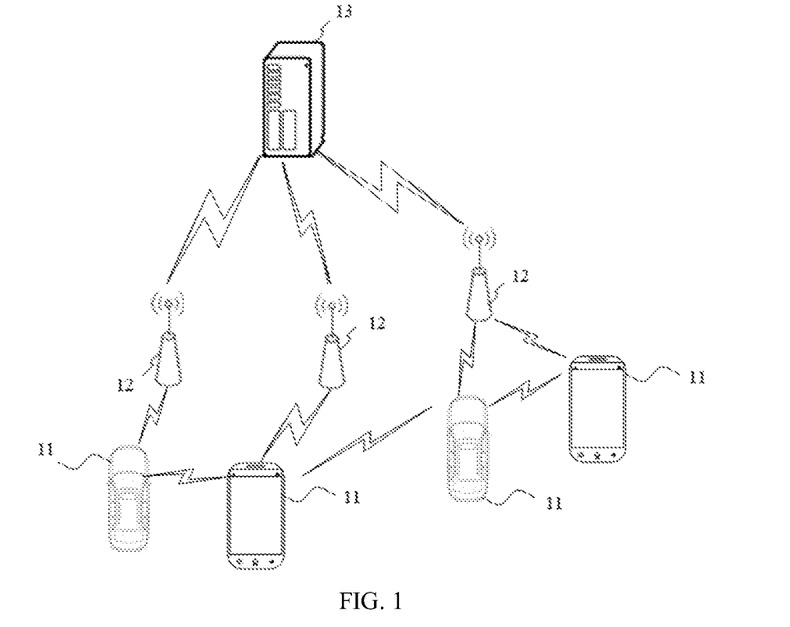
FIG. 1 illustrates a schematic structural diagram of a wireless communication system according to an example.

Please refer to FIG. 1, which illustrates a schematic structural diagram of a wireless communication system provided by an example of the present disclosure. As illustrated in FIG. 1, the wireless communication system is a communication system based on cellular mobile communication technologies, and may include several terminals 11 and several base stations 12.

The terminal 11 may be a device that provides voice and/or data connectivity to a user. The terminal 11 may communicate with one or more core networks via a radio access network (RAN). The terminal 11 may be an Internet of Things (IoT) terminal, such as a sensor device, a mobile phone (or called a "cellular" phone), and a computer equipped with the Internet of Things terminal, which may be, for example, a fixed, portable, pocket-sized, handheld, computer-built-in or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Or, the terminal 11 may be a device in an unmanned drone or an uncrewed aerial vehicle (UAV). Or, the terminal 11 may be a vehicle-mounted device, for example, it may be an on-board computer with a wireless communication function or a wireless communication device connected to the on-board computer. Or, the terminal 11 may be a roadside device, for example, it may be a street lamp, a signal lamp or another roadside device with the wireless communication capability.

The base station 12 may be a device at a network side of the wireless communication system. The wireless communication system may be a fourth-generation mobile communication (4G) system, which is also known as a Long Term Evolution (LTE) system. Or, the wireless communication system may be a 5G system, which is also known as a New Radio (NR) system or a 5G NR system. Or, the wireless communication system may be a next-generation system of a 5G system. The access network in the 5G system is sometimes referred to as a New Generation-Radio Access Network (NG-RAN) or a Machine-Type Communication (MTC) system.

The base station 12 may be an evolved Node-B (eNB) adopted in a 4G system. Alternatively, the base station 12 may be a next generation Node-B (gNB) adopting a centralized and distributed architecture in a 5G system. When adopting the centralized and distributed architecture, the base station 12 usually includes a central unit (CU) and at least two distributed units (DU). The central unit is provided with a protocol stack including a packet data convergence protocol (PDCP) layer, a radio link control protocol (RLC) layer, and a media access control (MAC) layer. The distributed unit is provided with a protocol stack of a physical (PHY) layer. The examples of the present disclosure do not limit the specific implementation of the base station 12.

A wireless connection may be established between the base station 12 and the terminal 11 through a wireless air interface. In various implementations, the wireless air interface can be a wireless air interface, e.g., based on fourth-generation mobile communication network technology (4G) standards; or, the wireless air interface can be a wireless air interface based on fifth-generation mobile communication network technology (5G) standards, such as a new radio; or, the wireless air interface can be a wireless air interface based on next-generation mobile communication network technology standards of 5G.

In some examples, an end-to-end connection may also be established between the terminals 11, for example, in an implementation calling for vehicle-to-everything (V2X) communication such as a vehicle-to-vehicle (V2V) communication, a vehicle-to-infrastructure (V2I) communication and a vehicle-to-pedestrian (V2P) communication.

In some examples, the above wireless communication system may further include a network management device 13.

The several base stations 12 are connected to the network management device 13 respectively. The network management device 13 may be a core network device in the wireless communication system. For example, the network management device 13 may be a mobility management entity (MME) in an evolved packet core (EPC) network. Alternatively, the network management device may be another core network device, such as a serving gate way (SGW), a public data network gate way (PGW), a policy and charging rules function unit (PCRF) or a home subscriber server (HSS). The implemented forms of the network management device 13 are not limited by the examples of the present disclosure.

Figure 2:
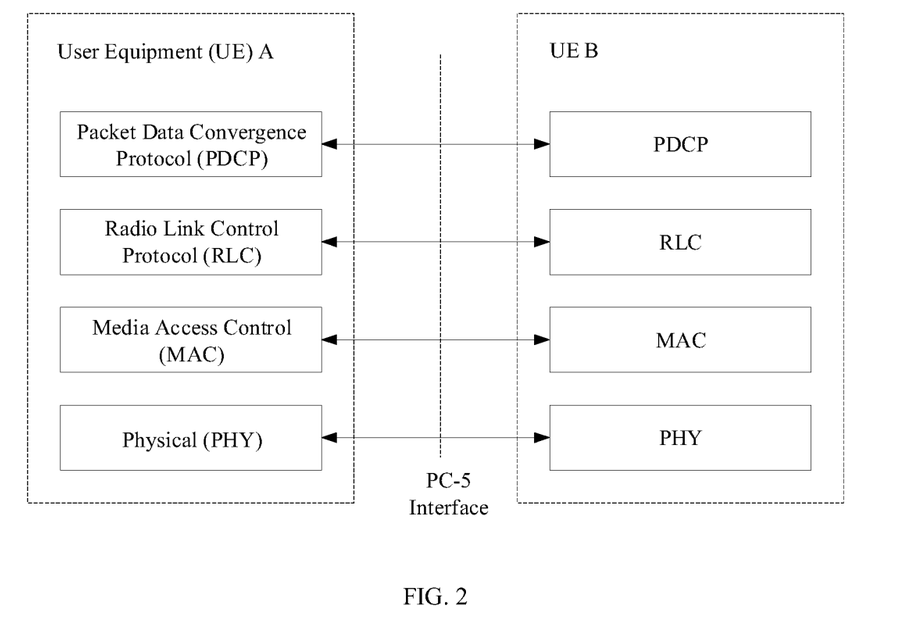
FIG. 2 illustrates a schematic diagram of a protocol stack of a sidelink communication way according to an example.

In the 4G era, sidelink communication way was introduced as a way to support a direct communication between UEs. The protocol stack of a sidelink communication approach is illustrated in FIG. 2 and described below. The interface between the UEs is a PC-5 interface. For the sidelink communication, transmission is addressed through source identification and target identification of a media access control (MAC) layer, and there is no need to establish a connection before the transmission.

In the 5G era, in order to support enhanced vehicle-to-everything (V2X) services, the sidelink is expected to be established as a unicast connection so as to support higher transmission rates and higher reliability.

A sidelink power control function is introduced for ensuring the quality of service (QoS) requirements of unicast data transmission are met. The UE as a transmitter will adjust a sidelink transmission power based on its result of measuring a sidelink channel.

A formula for calculating the sidelink transmission power is $Pe=P0+\alpha Pathloss$; where Pe is the transmission power, P0 is a transmission power base, $\alpha$ is an adjustment step size, and Pathloss is a path loss of the sidelink channel.

Before transmitting sidelink data, a first UE, e.g., a source UE, will send sidelink control information (SCI) to a second UE, e.g., a destination UE. The SCI carries time-frequency resource locations for subsequent data transmission, hybrid automatic repeat request (HARQ) information, identifications of source UE and destination UE, reservation information, etc.

Based on the above wireless communication system, various example methods described in the present disclosure to reduce a power consumption of UE communicating via a sidelink.

Figure 3:
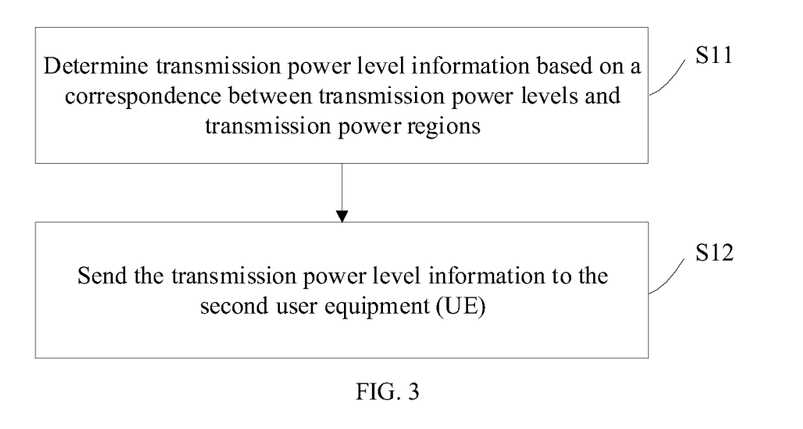
FIG. 3 illustrates a first flowchart of a method of processing transmission power level information according to an example.

FIG. 3 illustrates a first flowchart of a method of processing transmission power level information according to an example. As illustrated in FIG. 3, the method of processing transmission power level information is applied in a first user equipment (UE) and includes the following steps.

At step S11, transmission power level information is determined based on a correspondence between transmission power levels and transmission power regions.

In the above solution, the method further includes:
 receiving the correspondence between transmission power levels and transmission power regions, which is sent by a base station;
 or,
 obtaining the correspondence between transmission power levels and transmission power regions which is pre-configured.

In an example implementation, the step that the transmission power level information is determined based on the correspondence between transmission power levels and transmission power regions includes:
 obtaining the transmission power level information by inquiring about the correspondence based on a transmission power at which the first UE transmits sidelink data.

In that implementation, the first UE can obtain the transmission power level information by inquiring about the correspondence, so that the second UE can determine the transmission power matching the transmission power level information based on the same correspondence.

In an example implementation, the step that the transmission power level information is determined based on the correspondence between transmission power levels and transmission power regions includes:
 in response to determining that the first UE and the second UE are synchronized through a base station, determining the transmission power level information based on the correspondence sent by the base station.

In that implementation, before beginning their communication, the first UE and the second UE are synchronized through the base station, so that the correspondence adopted by the first UE and the correspondence adopted by the second UE are the same.

That is, on the basis of the correspondence between transmission power levels and transmission power regions sent by the base station in the case where the first UE and the second UE are synchronized through the base station, the transmission power level information is obtained through inquiring about the correspondence based on the transmission power at which the first UE transmits the sidelink data.

In an example implementation, the step that the transmission power level information is determined based on the correspondence between transmission power levels and transmission power regions includes:
 in response to determining that the first UE and the second UE are synchronized through an object other than a base station, determining the transmission power level information based on the correspondence that is pre-configured.

In that implementation, before beginning their communication, the first UE and the second UE are synchronized through an object other than a base station, so that the correspondence adopted by the first UE and the correspondence adopted by the second UE are the same.

For example, the first UE and the second UE may be synchronized through a global positioning system (GPS), or may be synchronized through one of the first UE and the second UE.

That is, on the basis of the pre-configured correspondence between transmission power levels and transmission power regions in the case where the first UE and the second UE are synchronized through the object other than a base station, the transmission power level information is obtained through inquiring about the correspondence based on the transmission power at which the first UE transmits the sidelink data.

At step S12, the transmission power level information is sent to the second UE.

In an example implementation, the step that the transmission power level information is sent to the second UE includes:
 sending, to the second UE, SCI carrying the transmission power level information.

Through the technical solutions of the examples of the present disclosure, the first UE determines the transmission power level information based on the correspondence between transmission power levels and transmission power regions, and sends the transmission power level information to the second UE. According to disclosed examples, it is convenient for the second UE to determine, based on the transmission power level information, a transmission power of the sidelink data transmitted from the first UE, without measuring the transmission power of the first UE by the second UE, which can reduce the power consumption of the second UE.

Figure 4:
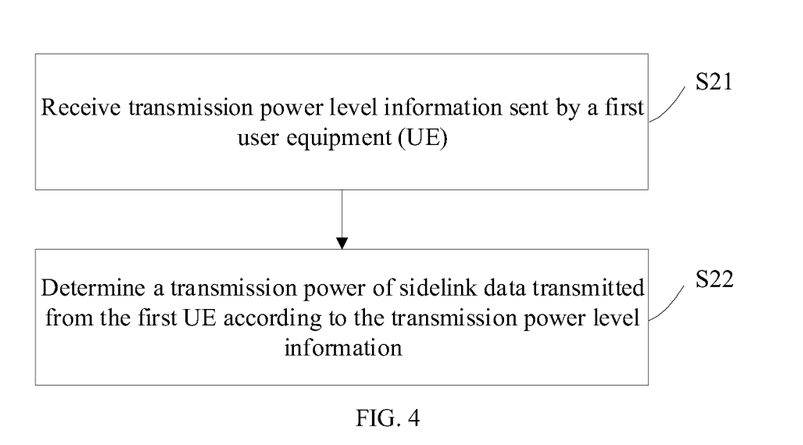
FIG. 4 illustrates a second flowchart of a method of processing transmission power level information according to an example.

FIG. 4 illustrates a second flowchart of a method of processing transmission power level information according to an example. As illustrated in FIG. 4, the method of processing transmission power level information is applied in a second user equipment (UE) and includes the following steps.

At step S21, transmission power level information sent by a first UE is received.

In an example implementation, the step by which the transmission power level information sent by the first UE is received includes:
receiving the transmission power level information carried in SCI sent by the first UE.

In that implementation, the second UE determines the transmission power level information via the SCI sent by the first UE.

At step S22, a transmission power of sidelink data transmitted from the first UE is determined according to the transmission power level information.

In an example implementation, the method further includes:
receiving a correspondence between transmission power levels and transmission power regions which is sent by a base station;
or,
obtaining a correspondence between transmission power levels and transmission power regions which is pre-configured.

In that implementation, the second UE obtains the correspondence, so that the correspondence adopted by the second UE is consistent with the correspondence adopted on the first UE side.

In an example implementation, the step by which the transmission power of the sidelink data transmitted from the first UE is determined based on the transmission power level information includes:
determining a transmission power region corresponding to the transmission power level information based on the correspondence between transmission power levels and transmission power regions; and
determining, from the transmission power region, the transmission power of the sidelink data transmitted from the first UE.

In an example implementation, the second UE takes any value within the transmission power region as the transmission power of the sidelink data transmitted from the first UE.

In that implementation, it is convenient for the second UE to determine the transmission power that matches the transmission power level information based on the correspondence, that is, to determine the transmission power of the sidelink data transmitted from the first UE based on the correspondence.

In an example implementation, determining the transmission power region corresponding to the transmission power level information based on the correspondence between transmission power levels and transmission power regions includes:
in response to determining that the first UE and the second UE are synchronized through a base station, determining the transmission power region corresponding to the transmission power level information based on the correspondence sent by the base station.

In that implementation, in the case where the first UE and the second UE are synchronized through the base station, the transmission power region corresponding to the transmission power level information is determined based on the correspondence between transmission power levels and transmission power regions sent by the base station.

In an example implementation, determining the transmission power region corresponding to the transmission power level information based on the correspondence between transmission power levels and transmission power regions includes:
in response to determining that the first UE and the second UE are synchronized through an object other than a base station, determining the transmission power region corresponding to the transmission power level information based on the correspondence that is pre-configured.

In that implementation, in the case where the first UE and the second UE are synchronized through the object other than a base station, the transmission power region corresponding to the transmission power level information is determined based on the pre-configured correspondence between transmission power levels and transmission power regions.

In the above solutions, the method wherein:
after receiving the transmission power level information, the second UE measures a sidelink channel to obtain a reference signal receiving power (RSRP) of the sidelink channel; and
the second UE determines a path loss of the sidelink channel based on the RSRP and the transmission power of the sidelink data transmitted from the first UE.

In the above solutions, the method further includes:
controlling, based on the path loss, a transmission power at which sidelink data is transmitted to the first UE.

Thereafter, the pathloss can serve as a reference for controlling the transmission power at which the sidelink data is transmitted to the first UE.

In an example implementation, the method wherein:
the second UE keeps the RSRP of the sidelink channel from being fed back to the first UE after obtaining the RSRP of the sidelink channel.

In that implementation, after receiving the transmission power level information, the second UE does not feed the RSRP of the sidelink channel back to the first UE, which can save the power consumption of the second UE.

Through the technical solutions described herein by way of the examples of the present disclosure, the transmission power level information sent by the first UE is received and the transmission power of the sidelink data transmitted from the first UE is determined based on the transmission power level information. In these solutions, the second UE can determine the transmission power of the sidelink data transmitted from the first UE based on the transmission power level information of the first UE, without measuring the transmission power of the sidelink data transmitted from the first UE, which can save the power consumption of the second UE.

Illustratively, UE1 and UE2 are synchronized through a base station, and UE1 and UE2 operate in accordance with the correspondence sent by the base station. The correspondence list is illustrated in Table 1. UE1 adopts a transmission power of −95 db, and thus the transmission power level 2 is carried in the SCI. After receiving the SCI sent by UE1, UE2 performs a detection and obtains a sidelink RSRP of −97 db. UE2 may assume that the transmission power of UE1 is −96 db based on the transmission power level 2 that is carried in the SCI by UE1, and then can determine the sidelink path loss to be 1 db based on the assumed transmission power of UE1 and the RSRP. UE2 controls transmission power at which its link data is transmitted to UE1 based on the sidelink path loss.

TABLE 1

| Levels | Transmission Power Regions |
| --- | --- |
| 1 | −92 db to −94 db |
| 2 | −95 db to −97 db |
| ... | ... |

UE1 adopts the transmission power of −95 db, and thus the transmission power level 2 is carried in the SCI. After receiving the SCI sent by UE1, UE2 performs the detection and obtains the RSRP of the sidelink channel which in this example is −97 db. UE2 assumes that the transmission power of UE1 is −96 db based on the transmission power level 2 that is carried in the SCI by UE1, and then determines the sidelink path loss to be 1 db based on the assumed transmission power of UE1 and the RSRP. UE2 controls transmission power at which its link data is transmitted to UE1 based on the sidelink path loss.

It should be understood that the correspondence list illustrated in Table 1 is an example of suitable values in some implementations. However, a person of ordinary skill upon reading this disclosure will appreciate other suitable values, and these can vary according to specific implementation circumstances. The disclosure is not limited to the example values appearing in the table.

It should also be understood that the list in Table 1 is only for illustrating the examples of the present disclosure. Those skilled in the art can make various obvious changes and/or substitutions based on the list in Table 1, and the obtained technical solutions still belong within the scope defined by the disclosure range of examples described in detail in the present disclosure.

Illustratively, UE1 and UE2 are synchronized through an object other than a base station, such as through the GPS or through one of the two UEs, and UE1 and UE2 operate in accordance with the pre-configured correspondence. An example correspondence list is illustrated in Table 2.

TABLE 2

| Levels | Transmission Power Regions |
| --- | --- |
| 1 | −92 db to −95 db |
| 2 | −96 db to −99 db |
| ... | ... |

In this example, UE1 adopts the transmission power of −95 db, and thus the transmission power level 1 is carried in the SCI. After receiving the SCI sent by UE1, UE2 performs a detection and obtains the RSRP of the sidelink channel is −97 db. UE2 may assume that the transmission power of UE1 is −94 db based on the transmission power level 1 that is carried in the SCI by UE1, and then can determine the sidelink path loss to be 2 db based on the assumed transmission power of UE1 and the RSRP. UE2 controls transmission power at which its link data is transmitted to UE1 based on the sidelink path loss.

It should be understood that the correspondence list illustrated in Table 2 is exemplary only. A person of ordinary skill, upon reading this disclosure would appreciated a range of suitable values, and that the values can vary based on specific implementation circumstances. The disclosure is not limited to the particular values shown in the Table.

It should be understood that the list in Table 2 is only for illustrating the examples of the present disclosure. Those skilled in the art can make various obvious changes and/or substitutions based on the list in Table 2, and the obtained technical solutions still fall within the scope defined by the range of examples set forth in detail in the present disclosure.

It should be noted that the method applicable to the first UE and the method applicable to the second UE described above can be integrated in one UE. Therefore, when transmitting its sidelink data, the UE integrating the above two methods can determine the path loss of the sidelink channel and control its transmission power of the sidelink data based on the path loss, without measuring the transmission power of the opposite UE and without feeding its measurement result of the sidelink channel back to the opposite UE.

Figure 5:
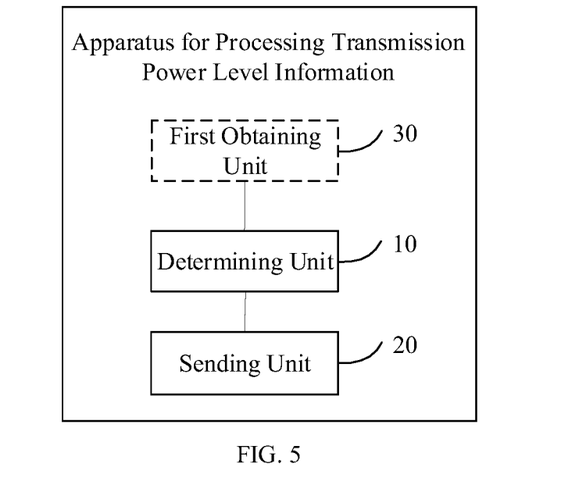
FIG. 5 illustrates a first schematic diagram of an apparatus for processing transmission power level information according to an example.

FIG. 5 illustrates a first schematic diagram of an apparatus for processing transmission power level information according to an example. The apparatus for processing transmission power level information is applied to a first user equipment (UE). Referring to FIG. 5, the apparatus includes a determining unit 10 and a sending unit 20.

The determining unit 10 is configured to determine transmission power level information based on a correspondence between transmission power levels and transmission power regions.

The sending unit 20 is configured to send the transmission power level information to a second UE.

In an example implementation, the sending unit 20 is further configured to send, to the second UE, SCI carrying the transmission power level information.

In an example implementation, the apparatus further includes a first obtaining unit 30.

The first obtaining unit 30 is configured to receive the correspondence sent by a base station; or, obtain the correspondence that is pre-configured.

In an example implementation, the determining unit 10 is further configured to obtain the transmission power level information by inquiring, or performing a query, to retrieve the correspondence based on a transmission power at which the first UE transmits sidelink data.

In an example implementation, the determining unit 10 is further configured to, in response to determining that the first UE and the second UE are synchronized through a base station, determine the transmission power level information based on the correspondence sent by the base station.

In an example implementation, the determining unit 10 is further configured to, in response to determining that the first UE and the second UE are synchronized through an object other than a base station, determine the transmission power level information based on the correspondence that is pre-configured.

Regarding the apparatuses in the above examples, the specific ways in which each module performs its operations have been described in detail in the related method examples, and need not be repeated here.

In practical applications, the specific structures of the determining unit 10, the sending unit 20, and the first obtaining unit 30 as described above may be implemented by a central processing unit (CPU), a micro controller unit (MCU), a digital signal processor (DSP), a programmable logic controller (PLC), or the like in the apparatus for processing transmission power level information or in a terminal to which the apparatus for processing transmission power level information belongs.

The apparatus for processing transmission power level information described in the examples may be installed on a terminal side.

Those skilled in the art will understand that the functions of each handling module of the apparatus for processing transmission power level information in the examples of the present disclosure can be understood by referring to the relevant description of the foregoing methods of processing transmission power level information applied to the first UE. The various handling modules of the apparatuses for processing transmission power level information in the examples of the present disclosure can be implemented by an analog circuit that implements the functions described in the examples of the present disclosure, or can be implemented by running a software program comprising processor-executable instructions that configure a processor to implement the functions described in the examples of the present disclosure, e.g., a processor disposed in a terminal.

The apparatuses for processing transmission power level information according to the examples of the present disclosure provide a convenient way for the second UE to determine, based on the transmission power level information, the transmission power of the sidelink data transmitted from the first UE, without measuring the transmission power of the first UE by the second UE, which can reduce the power consumption of the second UE.

Figure 6:
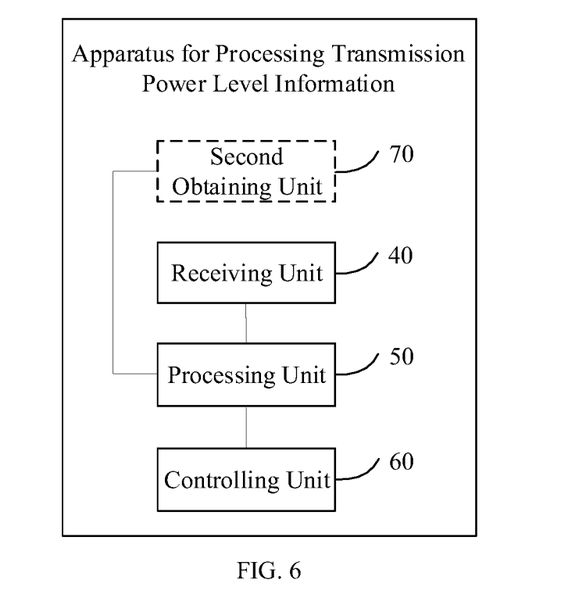
FIG. 6 illustrates a second schematic diagram of an apparatus for processing transmission power level information according to an example.

FIG. 6 illustrates a second schematic diagram of an apparatus for processing transmission power level information according to an example. The apparatus for processing transmission power level information is applied to a second user equipment (UE). Referring to FIG. 6, the apparatus includes a receiving unit 40 and a processing unit 50.

The receiving unit 40 is configured to receive transmission power level information sent by a first UE.

The processing unit 50 is configured to determine, based on the transmission power level information, a transmission power of sidelink data transmitted from the first UE.

In an example implementation, the receiving unit 40 is further configured to receive SCI sent by the first UE. The transmission power level information is carried in the SCI.

In an example implementation, the apparatus further includes a controlling unit 60.

The controlling unit 60 is configured to:
after receiving the transmission power level information, measure a sidelink channel to obtain an RSRP of the sidelink channel; and
determine a path loss of the sidelink channel based on the RSRP and the transmission power of the sidelink data transmitted from the first UE.

In an example implementation, the controlling unit 60 is further configured to control, based on the path loss, a transmission power at which sidelink data is transmitted to the first UE.

In an example implementation, the controlling unit 60 is further configured to keep the RSRP of the sidelink channel from being sent to the first UE.

In an example implementation, the apparatus further includes a second obtaining unit 70.

The second obtaining unit 70 is configured to receive the correspondence between transmission power levels and transmission power regions, which is sent by a base station; or, to obtain the correspondence between transmission power levels and transmission power regions which is pre-configured.

In an example implementation, the processing unit 50 is further configured to:
determine a transmission power region corresponding to the transmission power level information based on the correspondence between transmission power levels and transmission power regions; and
determine, from the transmission power region, the transmission power of the sidelink data transmitted from the first UE.

In an example implementation, the processing unit 50 is further configured to, in response to determining that the first UE and the second UE are synchronized through a base station, determine the transmission power region corresponding to the transmission power level information based on the correspondence sent by the base station.

In an example implementation, the processing unit 50 is further configured to, in response to determining that the first UE and the second UE are synchronized through an object other than a base station, determine the transmission power region corresponding to the transmission power level information based on the correspondence that is pre-configured.

Regarding the apparatuses in the above examples, the specific ways in which each module performs its operations have been described in detail above with respect to the corresponding method examples, and need not be repeated here.

In practical applications, the specific structures of the receiving unit 40, the processing unit 50, the controlling unit 60 and the second obtaining unit 70 as described above may be implemented by CPU, MCU, DSP, PLC, or the like in the apparatus for processing transmission power level information or in a terminal to which the apparatus for processing transmission power level information belongs.

The apparatus for processing transmission power level information described in the examples may be installed on a terminal.

Those skilled in the art would understand that the functions of each handling module of the apparatus for processing transmission power level information in the examples of the present disclosure can be understood by referring to the relevant description about the foregoing methods of processing transmission power level information applied to the second UE. The various handling modules of the apparatuses for processing transmission power level information in the examples of the present disclosure can be implemented by an analog circuit that implements the functions described in the examples of the present disclosure, or can be implemented by running a software program comprising processor executable instructions, which when executed by a processor configure the processor to perform the functions described in the examples of the present disclosure, e.g., a processor of a terminal.

Through the apparatuses for processing transmission power level information according to the examples of the present disclosure, the second UE can determine, based on the transmission power level information of the first UE, the transmission power of the sidelink data transmitted from the first UE, without measuring the transmission power of the sidelink data transmitted from the first UE, which can save signaling on the second UE side.

Figure 7:
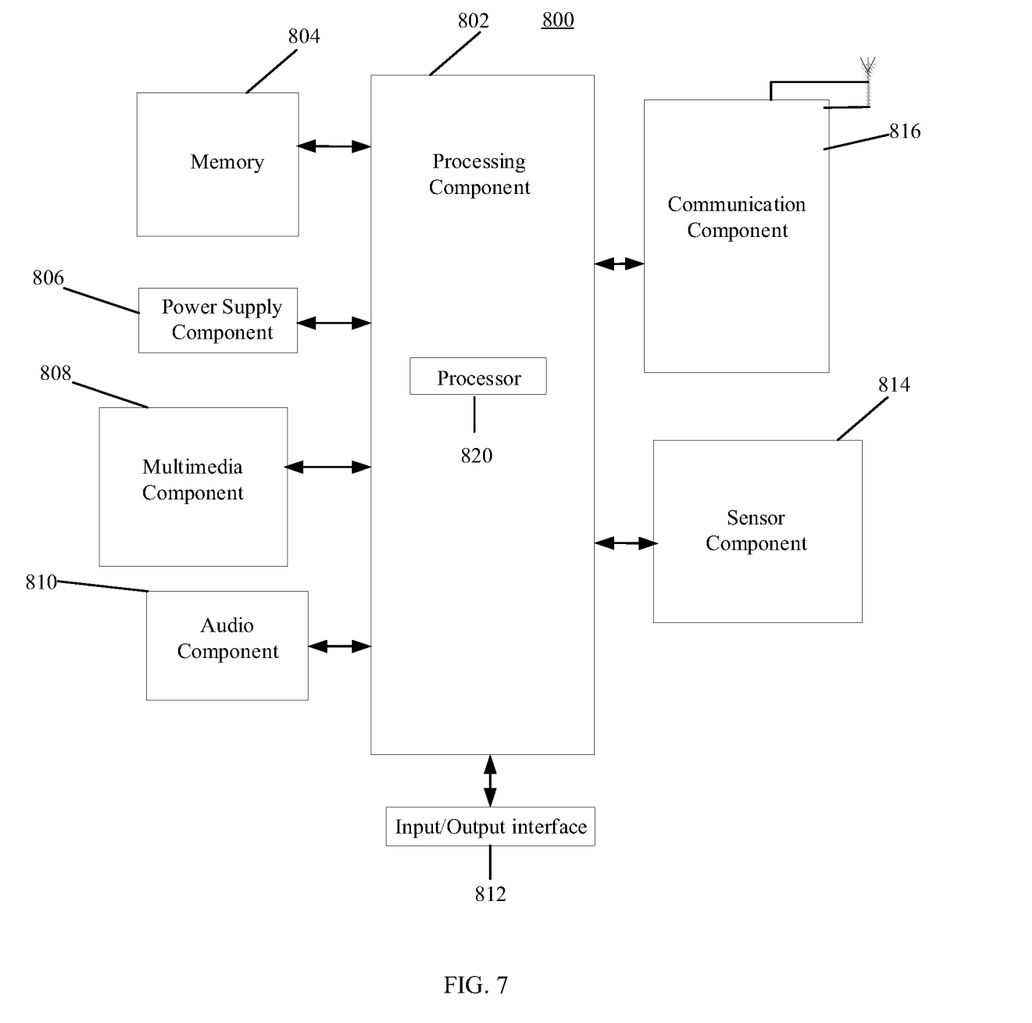
FIG. 7 illustrates a first block diagram of an apparatus 800 for processing transmission power level information according to an example.

FIG. 7 illustrates a block diagram of an apparatus 800 for processing transmission power level information according to an example. For example, the apparatus 800 may be a mobile phone, a computer, a digital broadcasting terminal, a messaging device, a game console, a tablet device, a medical device, a fitness device, a personal digital assistant, and the like.

Referring to FIG. 7, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the apparatus 800, such as operations associated with display, phone calls, data communications, camera operations, and recording operations. The processing element 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of instructions and/or data to support the operations of the apparatus 800. Examples of these include instructions for any application program or method operated on the apparatus 800, contact data, phonebook data, messages, pictures, videos, and the like. The memory 804 may be implemented by any type of volatile or non-volatile storage device or a combination thereof, such as a static random-access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides power to various components of the apparatus 800. The power supply component 806 may include a power management system, one or more power supplies, and other components associated with generating, managing, and distributing power for the apparatus 800.

The multimedia component 808 includes a screen providing an output interface between the apparatus 800 and a user. In some examples, the screen may include a liquid crystal display (LCD) or a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 808 includes a front camera and/or a rear camera. The front camera and/or rear camera may receive external multimedia data when the apparatus 800 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) that is configured to receive an external audio signal when the apparatus 800 is in an operating mode, such as a call mode, a recording mode, and a voice recognition mode. The received audio signal may be further stored in memory 804 or transmitted via communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include but not limited to, a home button, a volume button, a start button and a lock button.

The sensor component 814 includes one or more sensors to provide the apparatus 800 with status assessments in various aspects. For example, the sensor component 814 may detect an open/closed state of the apparatus 800 and a relative positioning of components such as the display and keypad of the apparatus 800, and the sensor component 814 may also detect a change in position of the apparatus 800 or a component of the apparatus 800, the presence or absence of user contact with the apparatus 800, orientation or acceleration/deceleration of the apparatus 800, and temperature change of the apparatus 800. The sensor component 814 may include a proximity sensor configured to detect the presence of a nearby object without any physical contact. The sensor component 814 may also include a light sensor, such as a complementary metal oxide semiconductor (CMOS) or a charge-coupled device (CCD) image sensor for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as Wi-Fi, 2G, 3G, or a combination thereof. In an example, the communication component 816 receives broadcast signals or broadcast related information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth® (BT) technology and other technologies.

In one or more examples, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods of processing transmission power level information.

In one or more examples, there is also provided a non-transitory computer readable storage medium including executable instructions, such as the memory 804 including executable instructions. The executable instructions can be executed by the processor 820 of the apparatus 800 to implement the above methods of processing transmission power level information. For example, the non-transitory computer storage medium may be an ROM, a random access memory (RAM), a CD-ROM, a magnetic tape, a floppy disk, an optical data storage device, and the like.

Figure 8:
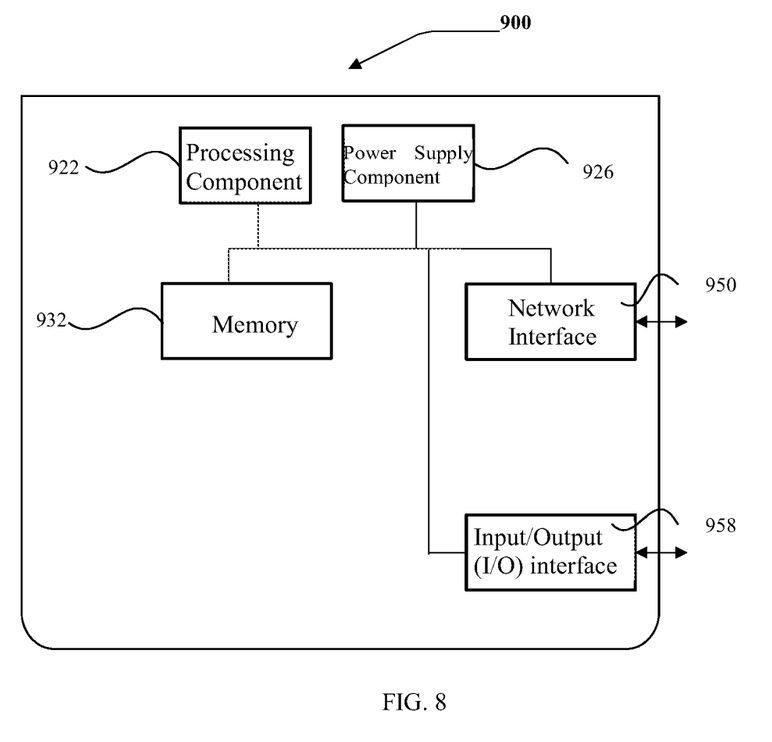
FIG. 8 illustrates a second block diagram of an apparatus 900 for processing transmission power level information according to an example.

FIG. 8 illustrates a block diagram of an apparatus 900 for processing transmission power level information according to an example. For example, the apparatus 900 may be provided as a server. Referring to FIG. 8, the apparatus 900 includes a processing component 922 which further includes one or more processors, and a memory resource represented by a memory 932 which is used to store instructions that can be executed by the processing component 922, such as application programs. The application programs stored in the memory 932 may include one or more modules, each of which corresponds to a set of instructions. In addition, the processing component 922 is configured to execute the instructions to perform the above-mentioned methods of processing transmission power level information.

The apparatus 900 may also include a power supply component 926 configured to perform power management for the apparatus 900, a wired or wireless network interface 950 configured to connect the apparatus 900 to a network, and an input/output (I/O) interface 958. The apparatus 900 may be operated based on an operating system stored in the memory 932, such as Windows Server™, Mac OS X™, Unix™, Linux™, or FreeBSD™.

The technical solutions described in the examples of the present disclosure can be implemented in various combinations to the extent these do not conflict.

Other implementations of the present disclosure will be readily apparent to those skilled in the art after referring to the specification and implementing the disclosure. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims.

It should be understood that the present disclosure is not limited to the above described definite structures illustrated in the drawings, and persons of ordinary skill upon reading this disclosure will recognize various modifications and changes could be made to the present disclosure without departing from the scope thereof. The scope of the present disclosure is to be limited only by the appended claims.

INDUSTRIAL APPLICABILITY

Through the technological solutions provided herein, a first UE determines transmission power level information based on a correspondence between transmission power levels and transmission power regions, and sends the transmission power level information to a second UE. The second UE determines, based on the transmission power level information, a transmission power of the sidelink data transmitted from the first UE. Therefore, without measuring the transmission power of the first UE by the second UE, power consumption of the second UE can be saved.

The invention claimed is:

1. A method of processing transmission power level information, performed by a first user equipment (UE), comprising:
   determining transmission power level information based on a correspondence between transmission power levels and transmission power regions; and
   sending the transmission power level information to a second UE, and
   wherein said determining the transmission power level information based on the correspondence between transmission power levels and transmission power regions comprises at least one of:
   in response to determining that the first UE and the second UE are synchronized through a base station, determining the transmission power level information based on the correspondence sent by the base station; or
   in response to determining that the first UE and the second UE are synchronized through an object other than a base station, determining the transmission power level information based on the correspondence that is pre-configured.

2. The method of processing transmission power level information according to claim 1, wherein said sending the transmission power level information to the second UE comprises:
   sending, to the second UE, sidelink control information (SCI) carrying the transmission power level information.

3. The method of processing transmission power level information according to claim 1, further comprising:
   receiving the correspondence sent by the base station; or,
   obtaining the correspondence, wherein the correspondence is pre-configured.

4. The method of processing transmission power level information according to claim 1, wherein said determining the transmission power level information based on the correspondence between transmission power levels and transmission power regions comprises:
   obtaining the transmission power level information by querying the correspondence based on a transmission power at which the first UE transmits sidelink data.

5. A method of processing transmission power level information, being applicable to a second user equipment (UE), comprising:
   receiving transmission power level information sent by a first UE;
   determining a transmission power region corresponding to the transmission power level information based on a correspondence between transmission power levels and transmission power regions; and
   determining, from the transmission power region, a first transmission power of first sidelink data transmitted from the first UE, and
   wherein said determining the transmission power region corresponding to the transmission power level information based on the correspondence between transmission power levels and transmission power regions comprises at least one of:
   in response to determining that the first UE and the second UE are synchronized through a base station, determining the transmission power region corresponding to the transmission power level information based on the correspondence sent by the base station; or
   in response to determining that the first UE and the second UE are synchronized through an object other than the base station, determining the transmission power region corresponding to the transmission power level information based on the correspondence that is pre-configured.

6. The method of processing transmission power level information according to claim 5, wherein said receiving the transmission power level information sent by the first UE comprises:
   receiving sidelink control information (SCI) sent by the first UE, wherein the transmission power level information is carried in the SCI.

7. The method of processing transmission power level information according to claim 5, further comprising:
   after receiving the transmission power level information, measuring a sidelink channel to obtain a reference signal receiving power (RSRP) of the sidelink channel; and
   determining a path loss of the sidelink channel based on the RSRP and the first transmission power of the first sidelink data transmitted from the first UE.

8. The method of processing transmission power level information according to claim 7, further comprising:
   controlling, based on the path loss, a second transmission power at which second sidelink data is transmitted to the first UE.

9. The method of processing transmission power level information according to claim 5, further comprising:
   receiving the correspondence between transmission power levels and transmission power regions which is sent by the base station;
   or,
   obtaining the correspondence between transmission power levels and transmission power regions which is pre-configured.

10. An apparatus for processing transmission power level information, comprising:
    one or more processors; and
    a memory for storing executable instructions for the one or more processors;
    wherein the one or more processors are configured to implement, when executing the executable instructions, the method of processing transmission power level information according to claim 1.

11. An apparatus for processing transmission power level information, comprising:
    one or more processors; and
    a memory for storing executable instructions for the one or more processors;
    wherein the one or more processors are configured to:
      receive transmission power level information sent by a first user equipment (UE);
      determine a transmission power region corresponding to the transmission power level information based on a correspondence between transmission power levels and transmission power regions; and
      determine, from the transmission power region, a first transmission power of first sidelink data transmitted from the first UE;
    wherein the one or more processors are further configured to at least one of:
      in response to determining that the first UE and a second UE are synchronized through a base station, determine the transmission power region corresponding to the transmission power level information based on the correspondence sent by the base station; or
      in response to determining that the first UE and the second UE are synchronized through an object other than the base station, determine the transmission power region corresponding to the transmission power level information based on the correspondence that is pre-configured.

12. A non-transitory computer readable storage medium storing executable instructions therein, wherein when being executed by one or more processors, the executable instructions enable the one or more processors to perform the method of processing transmission power level information according to claim 1.

13. A non-transitory computer readable storage medium storing executable instructions therein, wherein when being executed by one or more processors, the executable instructions enable the one or more processors to perform the method of processing transmission power level information according to claim 5.

14. The apparatus for processing transmission power level information according to claim 10, wherein the one or more processors are further configured to:
    send, to the second UE, sidelink control information (SCI) carrying the transmission power level information.

15. The apparatus for processing transmission power level information according to claim 10, wherein the one or more processors are further configured to:
    receive the correspondence sent by the base station;
    or,
    obtain the correspondence, wherein the correspondence is pre-configured.

16. The apparatus for processing transmission power level information according to claim 10, wherein the one or more processors are further configured to:
    obtain the transmission power level information by querying the correspondence based on a transmission power at which the first UE transmits sidelink data.

17. The apparatus for processing transmission power level information according to claim 11, wherein the one or more processors are further configured to:
    receive sidelink control information (SCI) sent by the first UE, wherein the transmission power level information is carried in the SCI.

18. The apparatus for processing transmission power level information according to claim 11, wherein the one or more processors are further configured to:
    after receiving the transmission power level information, measure a sidelink channel to obtain a reference signal receiving power (RSRP) of the sidelink channel; and
    determine a path loss of the sidelink channel based on the RSRP and the first transmission power of the first sidelink data transmitted from the first UE.

19. The apparatus for processing transmission power level information according to claim 18, wherein the one or more processors are further configured to:
    control, based on the path loss, a second transmission power at which second sidelink data is transmitted to the first UE.

20. The apparatus for processing transmission power level information according to claim 11, wherein the one or more processors are further configured to:
    receive the correspondence between transmission power levels and transmission power regions which is sent by the base station;
    or,
    obtain the correspondence between transmission power levels and transmission power regions which is pre-configured.

* * * * *

UNITED STATES PATENT AND TRADEMARK OFFICE
CERTIFICATE OF CORRECTION

| | | |
|---|---|---|
| PATENT NO. | : 12,309,718 B2 | Page 1 of 1 |
| APPLICATION NO. | : 17/629298 | |
| DATED | : May 20, 2025 | |
| INVENTOR(S) | : Xing Yang | |

It is certified that error appears in the above-identified patent and that said Letters Patent is hereby corrected as shown below:

On the Title Page

Item (73), under "Assignee", delete "Beijing Xiaomi Mobile Software Co., Ltd." and insert --Beijing Xiaomi Mobile Software Co., Ltd., Beijing, China--, therefore.

Signed and Sealed this
Twenty-fourth Day of June, 2025

Coke Morgan Stewart
*Acting Director of the United States Patent and Trademark Office*